United States Patent [19]
Anspach, Jr.; William E. et al.

[11] Patent Number: 5,458,375
[45] Date of Patent: Oct. 17, 1995

[54] ROTARY CONNECTOR FOR FLUID CONDUITS

[75] Inventors: William E. Anspach, Jr.; Eddy H. Del Rio, both of Palm Beach Gardens, Fla.

[73] Assignee: The Anspach Effort, Inc., Palm Beach Gardens, Fla.

[21] Appl. No.: 232,765

[22] Filed: Apr. 25, 1994

[51] Int. Cl.⁶ .............................. F16L 39/04; F16L 27/08
[52] U.S. Cl. .......................... 285/134; 285/281; 285/136; 285/278
[58] Field of Search ................... 285/134, 135, 285/136, 278–281

[56] References Cited

U.S. PATENT DOCUMENTS

| | | | |
|---|---|---|---|
| 2,701,146 | 2/1955 | Warren | 285/134 |
| 2,805,087 | 9/1957 | Shaw et al. | 285/134 |
| 2,834,465 | 5/1958 | McMichael | 285/134 |
| 3,173,207 | 3/1965 | Burzlaff . | |
| 3,445,064 | 5/1969 | Zajal et al. | 285/135 |
| 3,684,316 | 8/1972 | Lavender . | |
| 3,734,652 | 5/1973 | Barnett . | |
| 4,103,938 | 8/1978 | Lasater et al. . | |
| 4,142,742 | 3/1979 | Cornett et al. | 285/136 |
| 4,195,692 | 4/1980 | Dion-Biro . | |
| 4,210,975 | 7/1980 | Teague, Jr. et al. | 285/134 |
| 4,260,183 | 4/1981 | Krupp . | |
| 4,260,382 | 4/1981 | Thomson . | |
| 4,299,249 | 11/1981 | Nederman . | |
| 4,431,412 | 2/1984 | Lares et al. . | |
| 4,521,189 | 6/1985 | Lares et al. . | |
| 4,687,024 | 8/1987 | McMath . | |
| 4,827,960 | 5/1989 | Nitzberg et al. . | |
| 4,850,616 | 7/1989 | Pava | 285/135 |
| 4,921,010 | 5/1990 | Spirer . | |
| 4,964,559 | 10/1990 | Deniega et al. . | |
| 4,967,744 | 11/1990 | Chua . | |

FOREIGN PATENT DOCUMENTS

| | | | |
|---|---|---|---|
| 27491 | of 1910 | United Kingdom | 285/136 |
| 2004610 | 4/1979 | United Kingdom | 285/136 |

*Primary Examiner*—Eric K. Nicholson
*Attorney, Agent, or Firm*—Quarles & Brady

[57] ABSTRACT

A device connects two components in a manner that allows fluid to flow therebetween and allows one component to rotate with respect to the other. The device has a first coupling with first and second fluid passages extending between opposite ends. A collar is attached to one end of the first coupling and includes a first flange extending radially inward. A tubular fitting has a second flange extending radially outward and in-between the first flange and the first coupling. A first seal is compressed between the first and second flanges when pressurized fluid flows through the first coupling. A second coupling is attached to the tubular fitting and has third and fourth passages. A tubular second seal is sealingly received within and connects the first and third passages.

11 Claims, 2 Drawing Sheets

ROTARY CONNECTOR FOR FLUID CONDUITS

BACKGROUND OF THE INVENTION

The present invention relates to swivel joints for interconnecting two fluid conduits in a manner that allows rotary motion therebetween; and more particularly to such joints which are used to connect components of pneumatically powered surgical tools.

The use of pneumatically powered surgical and dental tools has become established and wide spread because of the high rotational speeds which can be achieved by air motors of relatively small size in comparison to electric motors. The tool is connected to a source of compressed air by two conduits, either a pair of hoses or a single hose with two conduits therein. One of the conduits supplies compressed air to the surgical tool. The other conduit carries the exhaust air from the tool back to the source of compressed air because it is disadvantageous to vent the exhaust air at the tool which could adversely affect the surgical site. U.S. Pat. Nos. 4,260,382; 4,431,412 and 4,521,189 describe dental tools of this general type.

However, the use of power-driven surgical tools has been hindered somewhat by the lack of flexibility and movement of the hand piece of the device gripped by the surgeon. The surgeon must be able to manipulate the tool into a variety of positions while operating on a patient and the hose supplying pressurized air to the tool often restricts that movement. Therefore, it is desirable to couple the air hose to the surgical tool in a manner which allows free rotation to occur between those two components. However, the coupling between the components must be air tight and air from the inlet conduit cannot leak to the atmosphere or to the outlet conduit.

SUMMARY OF THE INVENTION

An object of the present invention is to provide a connector having a pair of conduits and which allows rotary movement between two components attached by the connector. Another object of the present invention is to provide a connector in which force produced by pressurized fluid flowing through the connector acts to seal a joint between the two components.

These objects are satisfied by a rotary connector for connecting a first coupling to a second coupling. The first coupling has two ends, and first and second passages extending centrally between those ends. The first passage extends through the center of the first coupling and the second passage is to one side of the first passage. A collar is attached to and projects axially from one end of the first coupling and has a first flange that extends radially inward at an end of the collar that is remote from the first coupling. This first flange interlocks, when assembled, with a corresponding flange of a tubular fitting for the second coupling.

The tubular fitting has one end with the second flange extending radially outward. The second flange is disposed in-between the first flange and the one end of the first coupling to interlock with the first coupling. A first sealing member extends annularly around the tubular fitting and is compressed between the first and second flanges when pressurized fluid flows through the first coupling.

The second coupling is attached, preferably by pipe threads, to another end of the tubular fitting. The second coupling comprises a third passage extending centrally therethrough and a fourth passage extending therethrough to one side of the third passage. A tubular second sealing member is tightly received within the central passage of the first coupling and within the central passage of the second coupling to provide a fluid tight connection of those passages. Fluid is able to flow from the fourth passage in the second coupling through an inner chamber in the fitting and into the second passage of the first coupling.

The collar and the fitting, and thus the couplings connected to them, are able to swivel with respect to each other as their flanges can rotationally slide against the first sealing member. The first sealing member provides a fluid tight seal between the interior passages of the connector and the exterior environment. The second sealing member separates a fluid conduit provided by the first and second passages from another conduit provided by the third and fourth passages.

Thus, the connector of the invention is constructed so that the pressure of the fluid within each conduit acts to enhance the seals provided by the two sealing members. This pressure-based sealing also compensates for wear of the sealing members.

DETAILED DESCRIPTION OF THE PREFERRED EMBODIMENT

Figure 1:
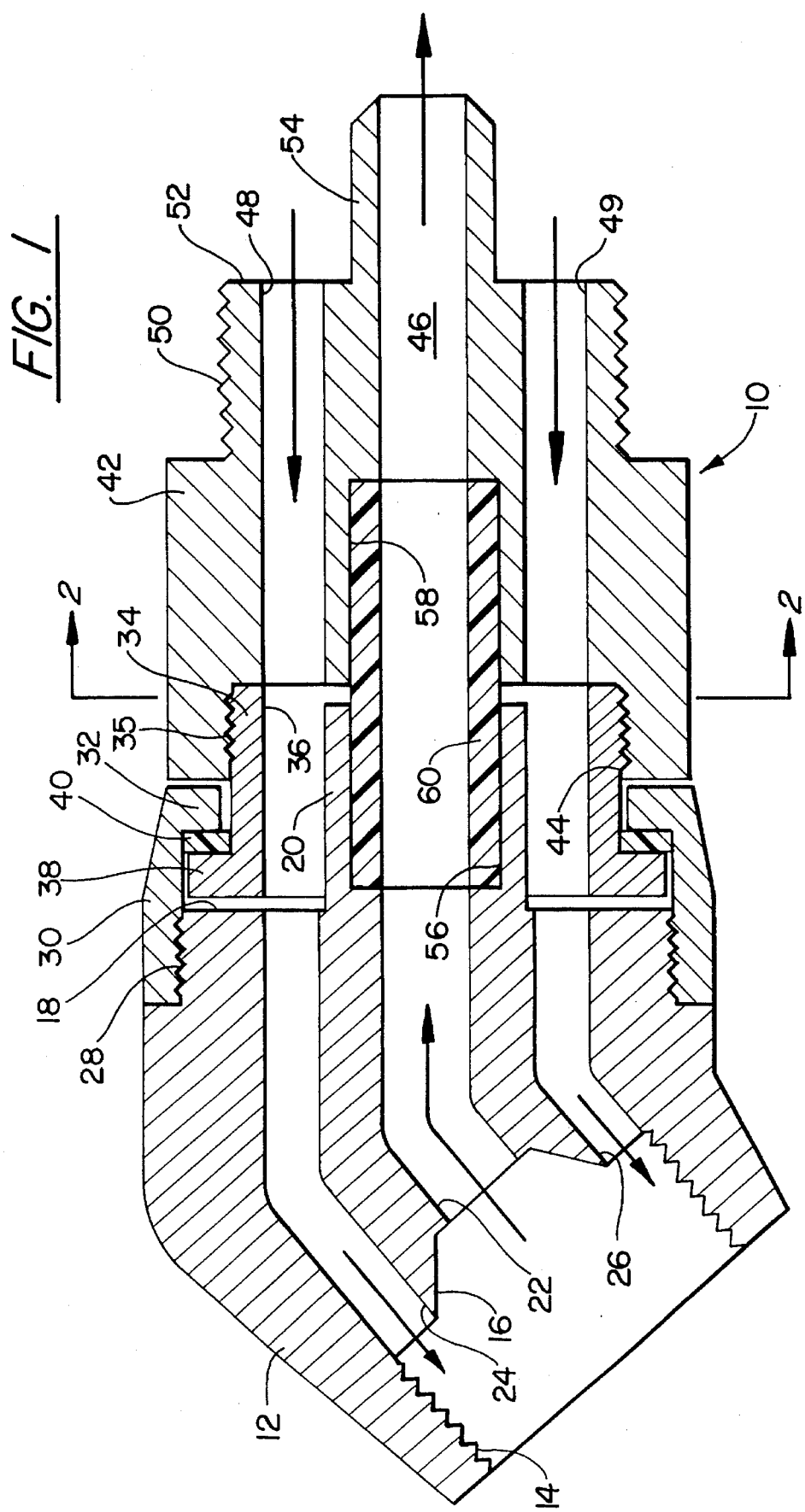
FIG. 1 is a longitudinal cross section through an embodiment of a swivel joint according to the present invention.
Figure 2:
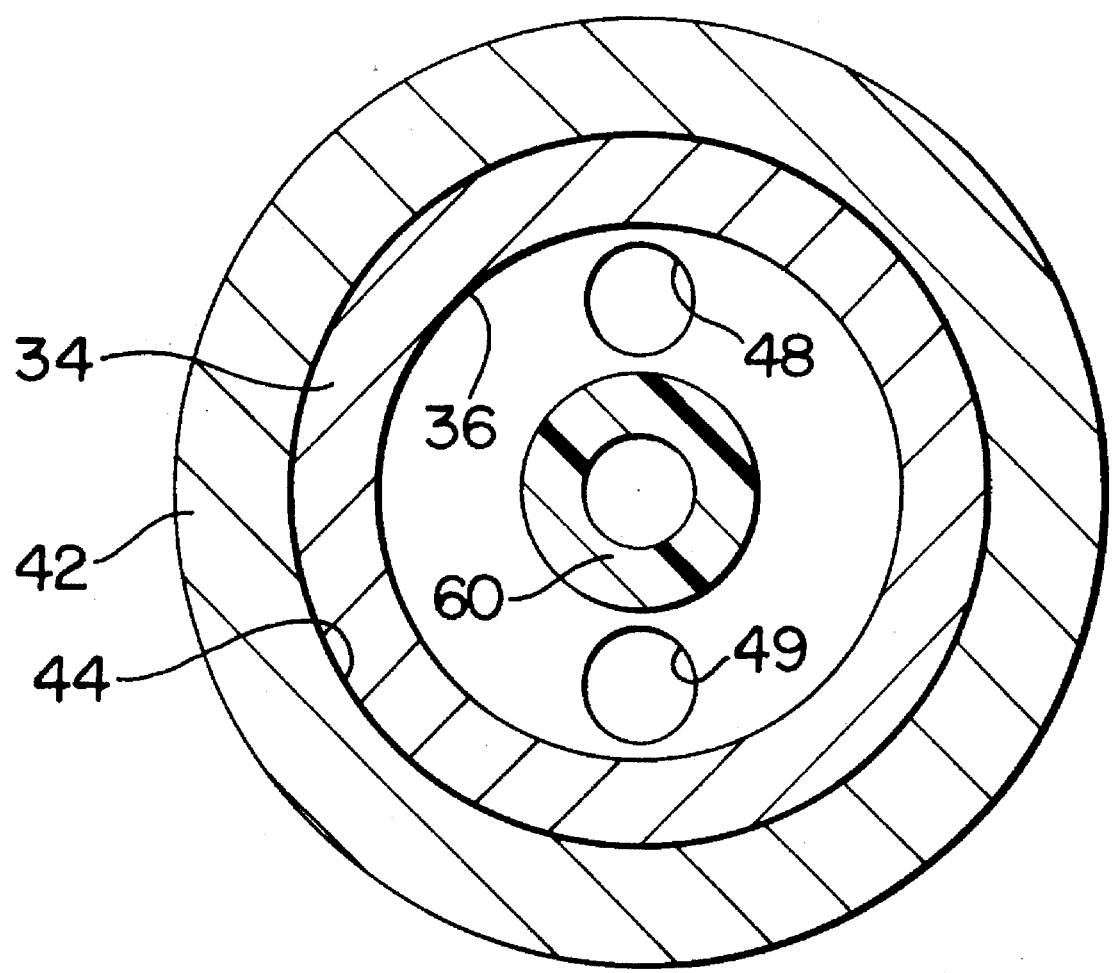
FIG. 2 is a cross section along line 2—2 in FIG. 1.

With reference to the drawings, a rotary connector 10 has a first coupling 12 for attachment to a hose leading from a source of pressurized air or other fluid. In the illustrated version, the first coupling 12 is a 45° elbow, although that coupling may be straight, a 90° elbow, or have a different angular bend. One end of the first coupling 12 can have an internally threaded aperture 14 for receiving a fitting on the end of the hose from the source of compressed air. The threaded aperture 14 terminates in a transverse inner wall 16. The other end of the coupling can have a circular end wall 18 from the center of which a tubular nipple 20 extends. A supply passage 22 extends centrally through the first coupling 12 from the inner wall 16 through the tubular nipple 20 at the other end of the coupling. Return passages can include, for example, a pair of return passages 24 and 26 which are diametrically opposed to each other on opposite sides of the supply passage 22 and extend from the inner wall 16 through the first coupling 12 to the end wall 18. The outer circumferential surface of the first coupling 12 adjacent to the end wall 18 can be recessed and have external threads 28 therein.

An annular collar 30 has internal threads at one end which engage the threads 28 on the outer surface of the first coupling 12. At the other end of the collar 30 is a radially inwardly projecting annular flange 32.

A tubular fitting 34 has a central circular chamber 36 within which is received the nipple 20 that extends from the first coupling 12. An external annular flange 38 projects radially outward from the end of fitting 34 which is proximate to the first coupling 12 so that the flange 38 extends into the space between the inwardly projecting flange 32 of the collar 30 and the end surface 18 of the first coupling 12. The two oppositely projecting flanges 32 and 38 interlock so that in the assembled rotary connector 10, the fitting 34 cannot be pulled away from the first coupling 12.

An annular washer-like, outer seal 40 made of Teflon (registered trademark of E. I. du Pont de Nemours & Co., Inc.) is located around the fitting 34 between its flange 38 and the flange 32 of the collar 30. The outer seal 40 provides an air tight seal between the two flanges during operation of the device. The end of the fitting 34 which is remote from flange 38 can have external threads for connection to a second coupling 42.

The second coupling 42 has a circular opening 44 at one end which is threaded to receive the external threads on the remote end of the fitting 34. The second coupling 42 has a central primary passage 46 and return passages, such as two diametrically opposed secondary passages 48 and 49 on opposite sides of the primary passage 46. The exposed end of the second coupling 42 can have a reduced diameter portion 50 with external threads for mating with the body of a surgical tool and an end wall 52. The secondary passages 48 and 49 extend through the second coupling 42 from the end wall 52 to the circular opening 44 in the opposite end of the coupling. A tubular extension 54 projects from the end wall 52 and the central passage 46 continues through the extension 54.

The nipple 20 of the first coupling 12 has an internal circular recess 56 that extends from its exposed end for substantially the entire length of the tubular nipple 20. A similar internal circular recess 58 extends around the central opening 46 from the circular opening 44 in the second coupling 42. The diameter of both recesses 56 and 58 is the same and the recesses are aligned when the components are assembled into the rotary connector 10. A tubular inner sealing member 60, made of Teflon®, is press-fitted into the recesses 56 and 58 of couplings 12 and 42, respectively, so as to provide an air-tight connection between passages 22 and 46. In addition, the second sealing member 60 provides a barrier between a fluid conduit formed by those passages 22 and 46 and another fluid conduit formed by the combination of the secondary passages 48 and 49 of the second coupling 42, the return passages 24 and 26 of the first coupling 12 and fitting chamber 36.

In assembling the rotary connector 10, the fitting 34 and outer sealing member 40 are inserted into the collar 30 and the collar is threaded onto the first coupling 12. Then the inner sealing member 60 is inserted into the recess 56 or 58 in either of the first or second couplings 12 and 42. Next the second coupling 42 is threaded onto the fitting 34 with the inner sealing member 60 extending between and engaging the two couplings.

In use, the first coupling 12 can be attached at its opening 14 to a two-conduit hose having one conduit aligned with the supply passage 22 and one or two other conduits communicating with the return passages 24 and 26. The second coupling 42 is connected to the surgical tool which is threaded onto the reduced diameter portion 50. The tool has an inlet in communication with the primary passage 46 of the second coupling 42. An exhaust passageway of the tool communicates with the secondary passages 48 and 49.

The pressurized air for driving the surgical tool is fed from the hose through supply passage 22 and the first coupling 12 where it continues to flow through the inner sealing member 60 and the primary passage 46 in the second coupling 42 to the surgical tool as indicated by arrows in passages 22 and 46. Exhaust air from the surgical tool enters the secondary passages 48 and 49 in the second coupling 42, as indicated by arrows in those passages. The exhaust air is under pressure and flows through the second coupling 42 into the cylindrical chamber 36 in the fitting 34 where the air flows around the nipple 20 that extends from the first coupling 12 into the chamber 36. The exhaust air then enters openings of the return passages 24 and 26 in the first coupling 12 and flows through that coupling to the hose connected thereto.

The pressurized air flowing through the inner sealing member 60 forces that member radially outward so as to enhance the sealing engagement of that member 60 with the recesses 56 and 58 in the first and second couplings 12 and 42. Similarly, the pressurized exhaust air flowing through a conduit formed by passages 48, 49, 24 and 26 and chamber 36 exerts pressure which forces the first coupling 12 away from fitting 34, thereby compressing the outer sealing member 40 between flanges 32 and 38. This compression of the sealing member 40 seals the space between the two flanges 32 and 38 while the connector 10 is pressurized. Therefore, the internal pressure of the gases flowing through the connector 10 enhances the air-tight seals provided between the rotatable components.

As the surgeon manipulates the tool, the second coupling 42, which is fixedly attached to the tool, can rotate 360° with respect to the first coupling 12. Specifically, the two flanges 32 and 38 are allowed to swivel with respect to one another and against the inner and outer sealing members 60 and 40 which maintain the integrity of the fluid passages during rotation.

The wear of the outer seal 40 with usage is compensated for by the forces exerted by the pressurized air which acts to force the two flanges 32 and 38 together compressing the seal 40 therebetween. The inner seal 60 accommodates axial movement of the two couplings 12 and 42 with respect to each other, as occurs with wear of the outer seal 40, without reduction of its sealing function.

We claim:

1. A rotary connector comprising:

a first coupling portion having first and second passages extending therethrough and an end having a circular opening with a radially inwardly extending first flange;

a second coupling portion with third and fourth passages extending therethrough and having a radially outwardly extending second flange interlocked with said first flange thereby preventing separation of the first and second coupling portions while permitting rotational movement therebetween;

an annular first sealing member which is in contact with and compressed between the first and second flanges when pressurized fluid flows through said first and second coupling portions wherein the fluid contacts the annular first sealing member; and a tubular second sealing member sealingly received within the first passage of said first coupling portion and sealingly received within the third passage of said second coupling portion, and providing a conduit which links said first and third passages.

2. The rotary connector as recited in claim 1 wherein the first passage has an enlarged cross-section region within which an end of said tubular second sealing member is received; and the third passage has an enlarged cross-section region within which an opposite end of said tubular second sealing member is received.

3. A rotary connector comprising:

a first coupling having first and second ends, a first passage extending centrally between the first and second ends, and a second passage extending between the first and second ends;

a collar attached to and projecting axially from the second end of said first coupling, and having a radially inwardly extending first flange at an end that is remote from said first coupling;

a tubular fitting having a radially outwardly extending second flange at one end wherein the second flange extends in between the first flange and the first coupling;

a first sealing member around said tubular fitting and being in contact with and compressed between the first and second flanges when pressurized fluid flows through at least one of the first and second passages wherein the fluid contacts the annular first sealing member;

a second coupling attached to another end of said tubular fitting and including two ends, a third passage extending centrally between the two ends, and a fourth passage extending between the two ends; and a tubular second sealing member sealingly received within the first passage of said first coupling and sealingly received within the third passage of said second coupling.

4. The rotary connector as recited in claim 3 wherein the first passage has an enlarged cross-section portion at the second end of said first coupling, within which portion an end of said tubular second sealing member is received; and the third passage has a enlarged cross-section end portion at the one end of said second coupling within which end portion an opposite said tubular second sealing member is received.

5. The rotary connector as recited in claim 3 wherein said first coupling further comprises a tubular nipple extending from said second end into said tubular fitting wherein the first passage extends through said tubular nipple.

6. The rotary connector as recited in claim 3 wherein said tubular fitting forms a chamber which provides a passageway for fluid to flow between the fourth passage in said second coupling and the second passage in said first coupling.

7. The rotary connector as recited in claim 3 wherein one of said first and second couplings is bent so that opposite ends are non-parallel.

8. A rotary connector comprising:

a first coupling having a first end and a circular second end, a first passage extending centrally between the first and second ends, and second and third passages extending between the first and second ends, wherein the circular second end has external threads;

an annular collar with one end having internal threads that engage the external threads of said first coupling, and another end with a first flange extending radially inward;

a tubular fitting having one end with a second flange extending radially outward, wherein the second flange extends in-between the first flange and the circular second end of the first coupling, said tubular fitting having another end with external threads;

an annular sealing member around said tubular fitting and being compressed between the first and second flanges when pressurized fluid flows through said first coupling;

a second coupling having one end with a circular opening that has internal threads which engage the external threads of said tubular fitting, a fourth passage extending centrally from the circular opening to another end of said second coupling, and fifth and sixth passages extending from the circular opening to other end of said second coupling; and a tubular sealing member sealingly received within the first passage of said first coupling and sealingly received within the fourth passage of said second coupling.

9. The rotary connector as recited in claim 8 wherein the first passage has an enlarged cross-section portion at the second end of said first coupling within which portion said tubular sealing member is received; and the fourth passage has an enlarged cross-section end portion at the one end of said second coupling within which end portion said tubular sealing member is received.

10. The rotary connector as recited in claim 8 wherein one of said first and second couplings is bent so that opposite ends are non-parallel.

11. The rotary connector as recited in claim 8 wherein said tubular fitting forms a chamber which provides a passageway for fluid to flow between the fifth and sixth passages in said second coupling and the second and third passages in said first coupling.

* * * * *